United States Patent [19]

Rajkai et al.

[11] Patent Number: 4,615,027
[45] Date of Patent: Sep. 30, 1986

[54] MULTIPROCESSOR-TYPE FAST FOURIER-ANALYZER

[75] Inventors: Gábor Rajkai; Rozália Szabó; István Dohár, all of Budapest; Sándor Vinkovits, Budaörs; Márta Hetei; György Flórián, both of Budapest, all of Hungary

[73] Assignee: Elektroakusztikai Gyár, Budapest, Hungary

[21] Appl. No.: 473,166

[22] Filed: Mar. 7, 1983

[30] Foreign Application Priority Data

Mar. 31, 1982 [HU] Hungary .................. 983/82

[51] Int. Cl.$^4$ .................. G06F 7/34; G06F 15/35
[52] U.S. Cl. .................. 364/726
[58] Field of Search ... 364/576, 726, 827, 200 MS File; 382/43

[56] References Cited

U.S. PATENT DOCUMENTS

| | | | |
|---|---|---|---|
| 3,588,640 | 6/1968 | Smith | 364/726 |
| 3,617,720 | 11/1971 | Gentleman | 364/726 |
| 3,662,161 | 5/1972 | Bergland et al. | 364/726 |
| 4,032,899 | 6/1977 | Jenny et al. | 364/200 |
| 4,060,716 | 11/1977 | Pekrul et al. | 364/576 |
| 4,092,723 | 5/1978 | Picquendar et al. | 364/726 |
| 4,155,117 | 5/1979 | Mitchell, Jr. et al. | 364/200 |
| 4,225,850 | 9/1980 | Chang et al. | 382/43 |
| 4,241,411 | 12/1980 | Krasner et al. | 364/726 |
| 4,396,983 | 8/1983 | Segarra et al. | 364/200 |
| 4,428,043 | 1/1984 | Catiller et al. | 364/200 |
| 4,432,019 | 2/1984 | Maier | 364/726 |
| 4,438,488 | 3/1984 | Shibayama | 364/576 |
| 4,503,496 | 3/1985 | Holzener et al. | 364/200 |

OTHER PUBLICATIONS

Rant, "Distributed Control . . . The Westinghouse Way" *Solutions* pp. 6–8, Mar./Apr. 1985.
Arsenault et al., "Self-Aligning Bilateral Chirp-Transform System" 1980 Ultrasonics Symposium, pp. 220–225.

*Primary Examiner*—James D. Thomas
*Assistant Examiner*—Dale M. Shaw
*Attorney, Agent, or Firm*—Gabriel P. Katona

[57] ABSTRACT

The invention relates to a programmable fast Fourier-analyzer device realized with MOS microprocessors, suitable for carrying out tasks connected with measurement, control and control engineering such as sound and vibration analysis. The frequency analyzer according to the invention contains an A/D converter, a plurality of microprocessors each, complete with a memory unit, for measurement data acquisition, calculation of the FFT and control of a cathode-ray display. Data transfer between the microprocessors is realized by repeated exchange of read and write memories between the microprocessors. The control element of the apparatus is an alphanumeric keyboard enabling the analyzer to be programmed in known program languages.

1 Claim, 1 Drawing Figure

MULTIPROCESSOR-TYPE FAST FOURIER-ANALYZER

BACKGROUND OF THE INVENTION

The invention relates to a programmable fast Fourier analyzer device realized with MOS microprocessors, suitable to carry out tasks connected with measurements, control and control engineering such as sound and vibration analysis, and the prevention of the fatal breakdown of equipment.

Several types of compact /bench-type, portable/ fast Fourier analyzer devices are allready known. In respect of constructional design, these can be divided into three basic groups: 1. A system of circuits built up of the elements of one of the groups of digital electrical circuits /e.g. TTL, ECL/ with application of a fast bipolar multiplier-accumulator. In order to establish connection to the control means, a cathode-ray-type display and other digital external elements, comprising microprocessors are applied. 2. Circuit system realized with a bit-slice bipolar microprocessor. Such processors are, on account of their high operation rate, also capable to carry out measurement-data acquisition, fast Fourier analysis, control-operation for the cathode-ray tube displaying the results, and the connection with the control means. For example, the narrow-band analyzer of the firm Bruel and Kjaer /Denmark/ type 2033 comprises a bipolar microprocessor. 3. Some instrument manufacturing firms—in order to supply their own instruments—possess a special own production-technology for the manufacture of MOS integrated circuits, having designed special integrated circuits suitable for digital filtering and for a FFT analysis. Such firms exist mostly in the United States and in Japan. For example, the spectrum analyzer type 3582A of the firm Hewlett-Packard /U.S.A./ is manufactured, using a microprocessor designed and produced by themselves.

A fast Fourier analyzer built up of the elements of one of the groups of digital circuits contains a great number of parts. Its drawback is that the development takes a long time connected with a great amount of expenses. Its further drawback is that it is "hardware-oriented", i.e. after the development has been finished, it can not be adapted to the special and variable requirements of any users without redesigning and alteration of the program. Its advantage is the high signal processing rate. Fast Fourier analyzers built around bit-slice bipolar microprocessors contain fewer parts than the former one, but they are built up of expensive parts and their development is very time-consuming. A further drawback is their lower signal processing rate, as compared with that of the former one. Their advantage is that their structure is not rigidly hardware-oriented and a limited possibility of programming can be undertaken by the manufacturer or by the user. The drawback of fast Fourier analyzers containing special MOS integrated circuits is their low signal processing rate, further the fact that such circuits are not available for anybody except the manufacturer. The aim of the present invention is the development of a fast Fourier analyzer which contains microprocessors prepared by the generally applied MOS technology and which can—by means of a universal keyboard—be adapted by the user to the individual task. The apparatus according to the invention as well as its development is more inexpensive and can be more flexibly adapted to the requirements of the fields of application than the known devices.

SUMMARY OF THE INVENTION

The fast Fourier analyzer apparatus according to the invention contains generally used, inexpensive microprocessors produced by the MOS technology. It has separate microprocessors for the solution of the different systems engineering tasks. Controlling of the measurement data acquisition, the Fourier-analysis, controlling of the display of the results on a cathode-ray tube and maintaining the connection with the control elements are carried out by the said microprocessors. Data transfer of the highest possible rate between the individual microprocessors is preferably realized by the repeated exchange of the reading out and writing in memory section loaded with the data to be transferred between two microprocessors. The microprocessors carrying out their tasks simultaneously, in a parallel manner and with connection between them exists only in the instant of the data transfer, preferably for the duration of one clock signal. In the embodiment preferable as regards application, an alphanumeric keyboard is used. By aid of the latter, the operator can program the apparatus in one of the known program languages, e.g. ASSEMBLER or BASIC. Programmability includes the adjustment of the data processing parameters of the fast Fourier-analyzer, such as input sensitivity and sampling frequency, and/or subsequent evaluation of the result of signal processing, such as the comparison of a reference spectrum with the actual one and signalling of non-wanted deviations.

DETAILED DESCRIPTION OF THE INVENTION

Figure 1:
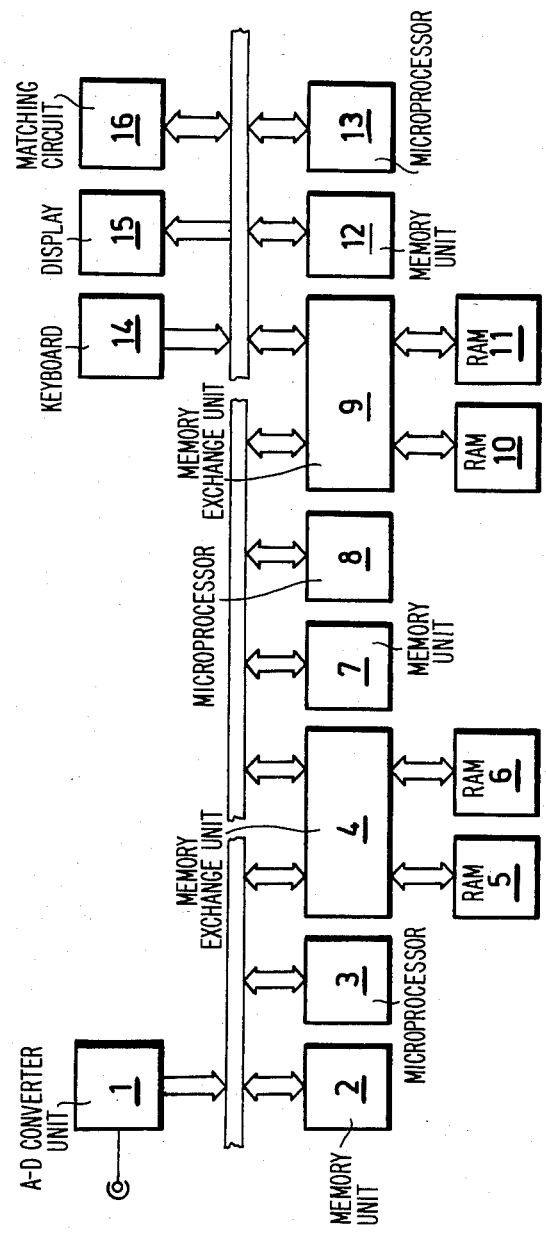

The systems engineeering design of the fast Fourier analyzer apparatus according to the invention is presented in the attached block diagram. The analog signal to be analyzed is conducted to an analog-digital converter unit 1 comprising an analog amplifier, an analog high-slope lowpass filter and an A/D converter. The digital output of the analog-digital A/D converter is connected through an address, data and control bus to microprocessor 3; unit 2 containing both a read only memory /ROM/ and a read and write in memory as well as memory exchange unit 4 are connected to the bus of the same microprocessor. Memory exchange unit 4 contains three-state digital switches, which connect the address, data and control buses of microprocessors 3 and 8 alternatingly to RAM units 5 and 6. The bus of microprocessor 8 is, in addition to memory exchange unit 4, also connected to unit 7 containing RAM and ROM circuits and to memory exchange unit 9. The internal design of memory exchange units 9 and 4 is identical. Memory exchange unit 9 connects the buses of microprocessors 8 and 13 alternatingly to RAM units 10 and 11. The bus of microprocessor 13 is also connected to unit 12 containing ROM and RAM circuits, to the control circuit of alphanumeric keyboard 14, to the control circuit of cathode ray display 15 and the matching circuit 16 of the standard external bus. Microprocessor 3 controls measurement data acquisition; it adjusts the amplification of the analog amplifier, the band limits of the analog filter and the sampling frequency; it starts data recording at the desired signal level and time instant; it controls loading memories 5 or 6 with measurement data acquisition contained in memory unit 2. The calculations necessary for Fourier-analysis are carried out by microprocessor 8. The input data block is contained in RAM unit 5 or 6, the program is stored in memory 7, the result is produced in RAM unit 10 or 11. Microprocessor 13 carries out tasks connected with display and controlling the keyboard and the external digital devices. It obtains the data, the frequency spectrum through memory control unit 9 from RAM unit 10 or 11; its program is contained in memory unit 12. In the following, the operation of the fast Fourier analyzer according to the present invention will be described.

The data appear at the output of the A/D converter 1 at a frequency being identical with the sampling frequency. These load, one after the other, RAM 5, the capacity of which is e.g. 1 K word. As soon as the RAM 5 is full, the microprocessor 3 emits a control signal to the memory exchange unit 4, which exchanges RAM units 5 and 6; i.e. it connects the RAM 5 to the bus of microprocessor 8 and the RAM 6 to the bus of the microprocessor 3. During the time of switchover, the supply voltage of the RAM-s 5 and 6 is not interrupted and both RAM-s are in the de-activated state and accordingly no data loss or overwriting occurs. Memory exchange is carried out within a time shorter than that between two samplings and consequently input data acquisition is continuous. The microprocessor 8 processes the data contained in the RAM 5 as an input data block and it carries out the calculation of the discrete Fourier-transform according to the FFT algorithm; the result is produced in the RAM 10. After the calculations are finished, the microprocessor 8 gives a signal to memory exchange unit 9, which hereupon changes RAM-s 10 and 11, i.e. it connects the RAM 10 to the bus of microprocessor 13 and RAM 11 to the bus of microprocessor 8. The microprocessor 13, after absolute value calculation and formation, brings the complex frequency spectrum stored in the RAM 10 to cathode-ray display 15. While calculation of the discrete Fourier-transform is being carried out, the RAM 6 is loaded with new input data. If the calculation of the FFT lasts a time shorter than necessary to load the RAM 6, the apparatus operates as a real-time analyzer, i.e. there are no time intervals left out. If the calculation of the FFT takes a time longer than necessary to load the RAM 6, the exchange of memories 5 and 6 does not occur until the microprocessor 8 has not finished the calculations. In this case, some sections of the input signal are disregarded from the point of view of data processing. However, in the case of the examination of periodic signals and transients this means no disadvantage.

An alphanumeric keyboard 14 is connected to the bus of microprocessor 13. The commands of the operator are mainly carried out by this processor. Commands addressed to microprocessors 8 and 3 are forwarded in the course of memory changes 10 to 11 and 5 to 6, respectively. The direction of the stream of commands is opposite to that of the stream of signals. The translator programs of the known program languages are stored in the ROM part of memory unit 12.

In the experimental apparatus realized by us, microprocessors of the types 8085 and 8086 were employed. The internal multiplication command of the processor calculating the FFT was not made use of; the task was realized by a separate multiplier circuit. The resolution of the A/D converter is 12 bits, the input data block consists of 1 K 16-bit words. The calculation of the FFT requires about 1 s, accordingly it is possible to carry out on-line analysis up to a frequency of 400 Hz. The largest bandwidth of the apparatus is 20 kHz. The resolution of the frequency spectrum corresponds to 400 points.

As it is apparent from the foregoing, the multiprocessor-type fast Fourier-analyzer according to the invention is really built up of inexpensive microprocessors produced by the MOS technology. This also offers the advantage that circuits and software developed for these can be applied with a small amount of development work and allow an inexpensive apparatus to be built. The total programmability of the apparatus is another advantage; by means of his program written in one of the known program languages, the user can adapt the analyzer to his individual problem.

What we claim is:

1. A multiprocessor type fast Fourier analyzer comprising: three independent processors each having a single independent bus for address, data and control, a microprocessor connected to the independent bus and a memory connected to the independent bus; and means for establishing bidirectional data flow between each two adjacent independent buses comprising two separate random access memories and a processor controlled memory exchange unit connected to the two adjacent independent buses and to the separate random access memories for connecting the two adjacent independent buses alternately to the two separate random access memories, and wherein a first independent bus of a first processor is provided for realizing data acquisition and is connected to an analog to digital converter unit, wherein a first memory exchange unit is connected to the first bus and a second independent bus of a second processor, said second processor performing a FFT analysis, wherein a second memory exchange unit is connected to said second bus and to a third independent bus of the third processor for I/O control, with said third bus connected to a display, an I/O device and to a keyboard for programming and controlling the analyzer.

* * * * *